United States Patent
Eich

(10) Patent No.: US 11,098,781 B2
(45) Date of Patent: Aug. 24, 2021

(54) DAMPING VALVE FOR A VIBRATION DAMPER

(71) Applicant: ZF Friedrichshafen AG, Friedrichshafen (DE)

(72) Inventor: Achim Eich, Lohmar (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 227 days.

(21) Appl. No.: 16/346,966

(22) PCT Filed: Oct. 4, 2017

(86) PCT No.: PCT/EP2017/075098
§ 371 (c)(1),
(2) Date: May 2, 2019

(87) PCT Pub. No.: WO2018/082852
PCT Pub. Date: May 11, 2018

(65) Prior Publication Data
US 2020/0063818 A1 Feb. 27, 2020

(30) Foreign Application Priority Data
Nov. 4, 2016 (DE) ...................... 10 2016 221 659.7

(51) Int. Cl.
| F16F 9/348 | (2006.01) |
| F16F 1/32 | (2006.01) |
| F16K 17/04 | (2006.01) |

(52) U.S. Cl.
CPC ............ F16F 9/3488 (2013.01); F16F 1/324 (2013.01); F16F 9/3485 (2013.01);
(Continued)

(58) Field of Classification Search
CPC ........ F16F 9/3488; F16F 1/324; F16F 9/3485; F16F 9/3484; F16F 2226/04;
(Continued)

(56) References Cited

U.S. PATENT DOCUMENTS 2,648,405 A * 8/1953 Palmer .................... F16F 9/348
188/320
2,676,676 A * 4/1954 Strauss ................. F16F 9/3485
188/320
(Continued)

FOREIGN PATENT DOCUMENTS

| DE | 761446 | 11/1952 |
| DE | 970515 | 9/1958 |

(Continued)

Primary Examiner — Marina A Tietjen
(74) Attorney, Agent, or Firm — Cozen O'Connor

(57) ABSTRACT

A damping valve includes a damping valve body with at least one through-channel, the outlet cross section of which is at least partially covered by at least one valve disk. The at least one valve disk is preloaded by at least two star springs. Each star spring has a support ring and a quantity of radial spring arms. The support rings lie one on top of the other in the installed position. The star springs are layered in opposite orientation such that the spring arms of at least two adjacent star springs face in the same direction with respect to the valve disk, and this star spring package has an anti-rotation element in an assembled position.

12 Claims, 4 Drawing Sheets

(52) U.S. Cl.
CPC .......... *F16K 17/042* (2013.01); *F16K 17/044* (2013.01); *F16F 2226/04* (2013.01); *F16F 2226/042* (2013.01); *F16F 2226/048* (2013.01)

(58) Field of Classification Search
CPC .......... F16F 2226/042; F16F 2226/048; F16K 17/042; F16K 17/044
See application file for complete search history.

(56) References Cited

U.S. PATENT DOCUMENTS

| | | | | | |
|---|---|---|---|---|---|
| 2,699,844 | A | * | 1/1955 | McIntyre | F16F 9/348 188/315 |
| 2,748,898 | A | | 6/1956 | Burcier | |
| 3,001,419 | A | * | 9/1961 | Hymans | F16F 1/324 74/574.2 |
| 5,085,300 | A | * | 2/1992 | Kato | F16F 9/348 188/280 |
| 8,794,265 | B2 | | 8/2014 | Handke | |

FOREIGN PATENT DOCUMENTS

| | | |
|---|---|---|
| DE | 2353402 | 5/1975 |
| DE | 3001419 | 7/1981 |
| DE | 3906128 | 8/1990 |
| DE | 19524948 | 2/1996 |
| DE | 19731138 | 2/1999 |
| DE | 102009043572 | 4/2011 |
| DE | 102009054121 | 5/2011 |
| DE | 102010062324 | 6/2012 |
| EP | 1416188 | 5/2004 |

* cited by examiner

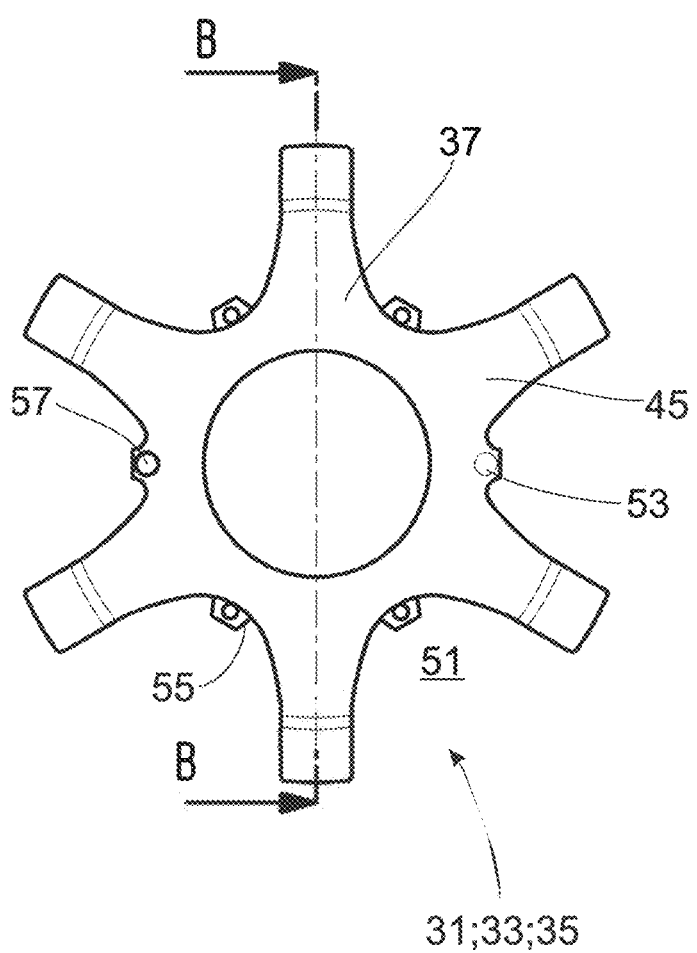
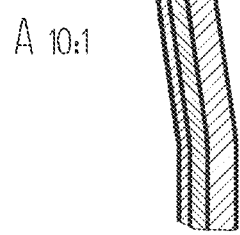
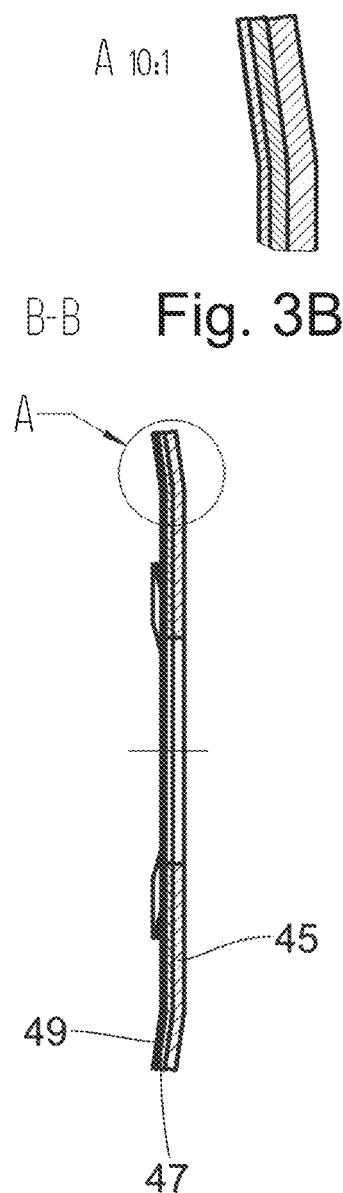
Fig. 3B
Fig. 2
Fig. 3A

DAMPING VALVE FOR A VIBRATION DAMPER

PRIORITY CLAIM

This is a U.S. national stage of application No. PCT/EP2017/075098, filed on Oct. 4, 2017. Priority is claimed on the following application: Country: Germany, Application No.: 10 2016 221 659 7, filed: Nov. 4, 2016; the content of which is incorporated in its entirety herein by reference.

FIELD OF THE INVENTION

The present invention is directed to a damping valve for a vibration damper with at least two star springs having a supporting ring and a plurality of radial spring arms.

A damping valve having a damping valve body with through-channels, the outlet cross sections of which are at least partially covered by a valve disk, is known from DE 761 446 B. A star spring which is supported at a supporting disk for limiting the lift movement of the valve disk provides for the necessary closing force of the valve disk. A star spring has a support ring from which a plurality of spring arms extend radially outward. The support ring aside, the spring arms are not connected to one another so that each spring arm can deform independently from an adjacent spring arm.

Extending between the spring arms are free spaces which, inter alia, form a flow path for further through-channels with an opposed flow direction. The free spaces have a larger cross section than the spring arms in circumferential direction.

DE 23 53 402 A1 discloses a damping valve in which star springs are also used in the configuration according to FIGS. 4 and 5. The star springs with the basic construction according to DE 761 446 B are arranged so as to be layered in opposite orientation, i.e., the support rings contact one another and the spring arms extend diametrically proceeding from their support rings.

Star springs offer the basic advantage of enabling asymmetrical closing forces on the valve disk. While larger closing forces are also possible in principle, this significantly reduces the life of the star spring.

It is an object of the present invention to mitigate the problem of limited life in heavily loaded star springs.

SUMMARY OF THE INVENTION

This object is met in that the star springs are layered in the same orientation such that the spring arms of at least two adjacent star springs face in the same direction with respect to the valve disk, and this star spring package has an anti-rotation element in an assembled position.

The advantage of the invention consists in that individual, weaker star springs which are substantially noncritical with respect to service life are now used instead of a single star spring. However, the anti-rotation element which ensures a layer arrangement of the spring arms acts so that the biasing forces of the individual star springs are bundled in an exact manner and so that no spring arm is installed without preloading or with reduced preloading. This layer arrangement must be maintained only for transporting from the material hopper to the finished damping valve. When the assembly of the damping valve is completed, the frictional forces hold the spring arms in the layer arrangement even if the anti-rotation element ceases to be effective.

In one embodiment, the anti-rotation element is formed by at least one weld. Spring steel is generally more difficult to weld than construction steel, for example, but the stresses on the layer arrangement during assembly are also only very slight.

It is particularly advantageous when the weld is carried out as a resistance weld. The resistance weld allows short cycle times and simple machinery.

In order that a plurality of star springs can also be welded together in a precise manner, the star spring has at least one access opening which is at least partially covered with a support portion by the adjacent star spring. Accordingly, always two adjacent star springs are welded together. If more than two star springs are used in a layer arrangement, the star springs have a plurality of access openings which are arranged in a defined angular position relative to the spring arms. A support portion can then very easily be brought in register with a plurality of access openings by rotating the assembly position and, therefore, also two support portions in the middle of the layer arrangement can be maintained accessible for a welding tool and only these two support portions can then be welded together specifically.

Alternatively, the weld can be carried out as a laser weld which is very advantageous particularly with respect to heat introduced into the star springs.

With regard to fastening in a low-tension zone of the star spring, the anti-rotation element enters into a connection with the support ring outside of the spring arm.

In addition, the support ring can have one radial projection for the arrangement of the anti-rotation element. In practice, the radial projection does not alter the spring characteristic of the star springs.

If there is no suitable welding technique available, for example, the anti-rotation element can also be formed by a fixing pin which passes through the support rings.

In principle, the anti-rotation element can also be formed by a fixing sleeve which, for example, forms an interference fit with the support ring.

Accordingly, it is possible for the fixing sleeve to engage at the support rings at the inner side. Even if the fixing sleeve protruded axially over the layer arrangement of the support rings to a slight extent, this would not constitute a functional defect because the installation space for the layer arrangement would afford sufficient free space.

Alternatively, the fixing sleeve can also engage at the support rings on the outer side and can have relief cuts for receiving the spring arms. For example, an annular base having axial protrusions which engage in the free space between the spring arms of the star springs can be provided.

Depending on the size and material characteristics of the star springs, it can also be provided that the support rings are connected to one another by clinched connections. The clinched connection need not have a closing head. Radial pressing on a small cross section is entirely sufficient to fix the start springs to one another for the assembly sequence.

In principle, it is also be possible to glue the support rings to one another. This variant requires very little expenditure.

BRIEF DESCRIPTION OF THE DRAWINGS

The present invention will be described in more detail referring to the following description of the figures, in which:

FIG. 2 is a top view of star springs;

FIG. 3A is cross-sectional view of a star spring package;

FIG. 3B is the detail A of FIG. 3A;

DETAILED DESCRIPTION OF THE PRESENTLY PREFERRED EMBODIMENTS

Figure 1:
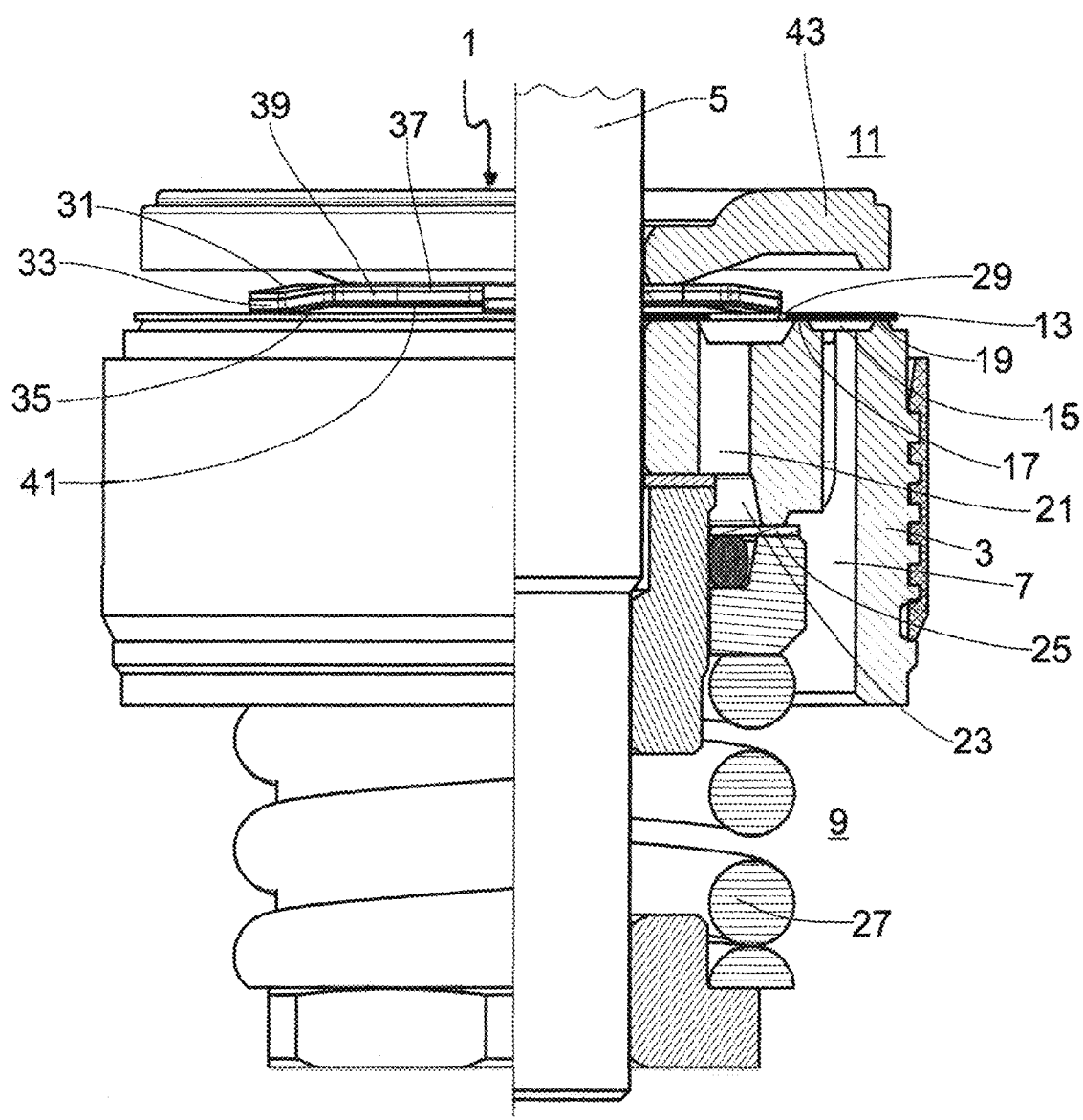
FIG. 1 is a sectional view of damping valve of the present invention.

FIG. 1 shows a damping valve 1 constructed as a piston valve. However, the invention is not limited to this constructional form in principle. Damping valve 1 comprises a damping valve body 3 which has at least one through-channel at a piston rod 5. This through-channel 7 can connect a working chamber 9 remote of the piston rod and a working chamber 11 on the piston rod side. An outlet cross section of the at least one through-channel 7 is at least partially covered by a valve disk 13. To this end, a plurality of through-channels 7 run into an annular groove 15 which is bounded by an inner valve seat surface 17 and an outer valve seat surface 19 and which forms the outlet cross section.

Further through-channels 21 for a flow from the working chamber 11 on the piston rod side to the working chamber 9 remote of the piston rod are on a radially inner pitch circle with respect to the inner valve seat surface 17. These through-channels 21 also run into an annular groove 23 at the underside of the damping valve body 3 and are covered by a second valve disk 25 which is preloaded in closing direction by a helical spring 27. Other types of spring can also be used in principle.

The valve disk 13 on the upper side of damping valve body 3 has passage cross sections 29 into through-channels 21. A plurality of star springs 31; 33; 35 which contact a supporting disk 43 by their inside support rings 37; 39; 41 are preloaded in closing direction of valve disk 13. All of the support rings 37; 39; 41 lie one upon the other and are clamped between the damping valve body 3 with valve disk 13 and the supporting disk 43.

FIG. 2 shows a top view of star springs 31; 33; 35. Every star spring 31; 33; 35 has the support ring 37; 39; 41 from which a plurality of spring arms 45 extend radially. In FIG. 2, spring arms 45 extend radially outward. The invention would also be conceivable with an outer support ring and spring arms facing radially inward.

All of the spring arms 45; 47; 49 are layered with maximum overlapping within the framework of the manufacturing tolerance. As is shown in FIG. 1, all of the spring arms 45; 47; 49 of at least two adjacent star springs face in the same direction with reference to valve disk 13. FIG. 3 is referred to in addition, wherein the individual spring arms 45; 47; 49 of the layered star springs 31; 33; 35 are clearly visible.

The star spring package according to FIGS. 1 to 3 has, in the assembly position, i.e., corresponding to FIG. 3, an anti-rotation element which ensures that all of the spring arms 45; 47; 49 of an angular orientation also overlap. A star spring should be prevented from being mounted so as to be rotated with respect to the adjacent star spring and accordingly its spring arms engaging in a free space 51 between two spring arms of the adjacent star spring.

In the construction according to FIGS. 2 and 3, the anti-rotation element is formed by a weld 53 carried out as a resistance weld. Between two adjacent spring arms, and, therefore, outside of the spring arms, every support ring 37; 39; 41 has at its outer diameter a radial projection 55 for arranging the anti-rotation element 53. In this case, one of the radial projections has an access opening 57 which is at least partially closed by the support ring 39 of the adjacent star spring 33.

Figure 4:
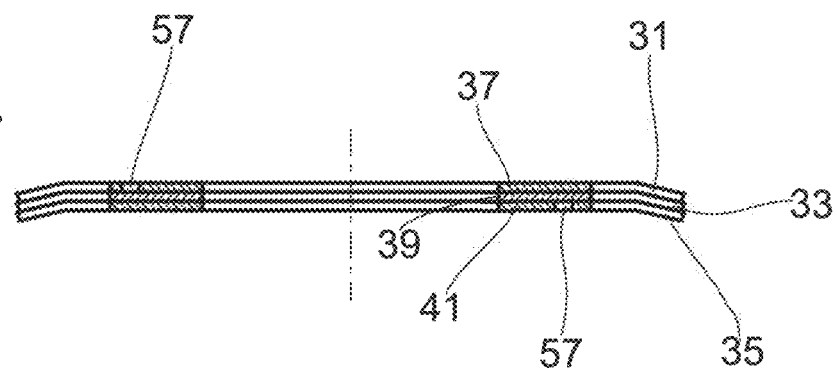
FIG. 4 is a cross-sectional view of a star spring package.

Star springs 31; 33; 35 are shown in FIG. 2 with six radial projections 55. If star springs with different material thicknesses are used, the covering star springs 31; 35 can be provided in each instance with an access opening 57 and the middle star spring 33 can be formed without an access opening. Accordingly, two adjacent star springs can be welded together without difficulty, and the access opening facilitates contact between the electrode and the middle star spring 33 (FIG. 4).

If more than three star springs of the same type are welded, it would be possible to form one radial projection 55 without access opening 57 and the other projections 55 of the star springs with access openings 57. Two adjacent star springs can be aligned identically to one another with their access openings 57 during the layering of the star springs to form a package. Consequently, the projections 55 without access openings 57 axially overlap and can accordingly be welded easily.

The following star spring pair is mounted so as to be offset by the distance of a spring arm but, exactly like the first star spring pair, with identical alignment of the access openings. Consequently, via the existing access openings of the star springs above and underneath, a welding tool can be guided to the star spring pair therebetween to weld this pair to the radial projections without access opening.

Figure 5:
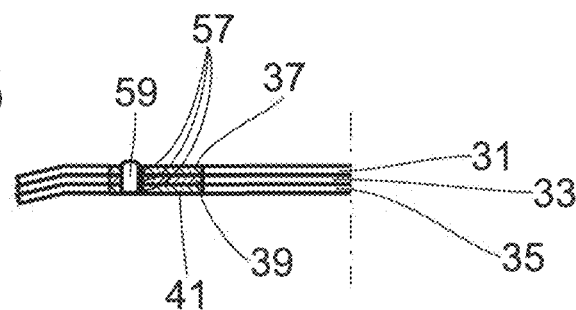
FIG. 5 is a partial cross-section view of a star spring package with fixing pin.

In FIG. 5, all of the radial projections 55 have an access opening 57 via which a fixing pin 59 as anti-rotation element extends through the support rings 37; 39; 41. A radial projection can be useful in this variant, but is not absolutely necessary. In principle, the radial projection 55 serves to provide a radial cross section to reduce load on the support ring. Given a corresponding support ring cross section, a pronounced radial projection 55 can be dispensed with.

It has turned out that an individual anti-rotation element 57 can exert a sufficiently large holding force to hold the star spring package together during the assembly sequence.

Figure 6:
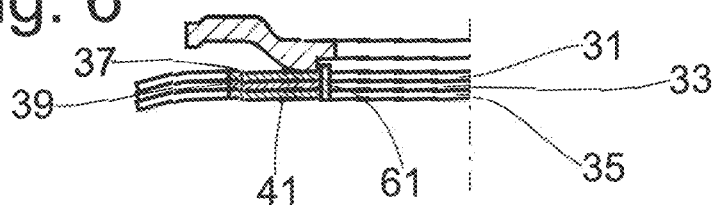
FIG. 6 is a partial cross-sectional view of a star spring package with a fixing pin.

FIG. 6 shows a section through a star spring package 31; 33; 35 which has as anti-rotation element a fixing sleeve 61 which acts inwardly at the support rings 37; 39; 41 and forms an interference fit with the latter. During assembly, the individual star springs 31; 33; 35 are aligned in circumferential direction relative to one another and the fixing sleeve 61 is subsequently inserted. The fixing sleeve can protrude over the star spring package. A small free space can be provided in the supporting disk for receiving the protruding sleeve volume.

Figure 7:
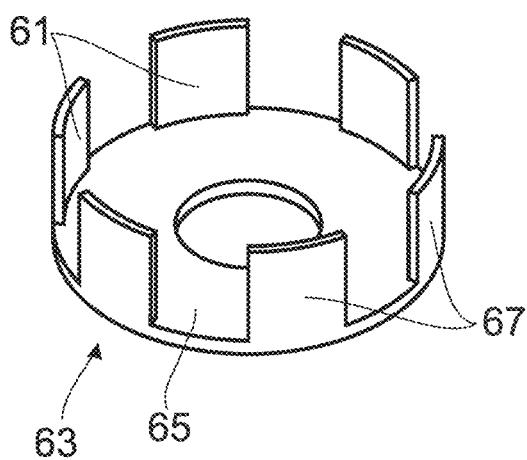
FIG. 7 is a partial cross-sectional view of a star spring package with fixing sleeve.

FIG. 7 shows that the fixing sleeve 61 can also act outwardly at the support rings 37; 39; 41 in that they have relief cuts 63 for receiving the spring arms 45; 47; 49. The fixing sleeve 61 has a base 65 with the planar extension of the support rings 37; 39; 41. Projecting from the latter are the holding tabs 67 which engage between the spring arms 45; 47; 49 and contact the edges of the support rings 37; 39; 41 by their inner wall.

Figure 8:
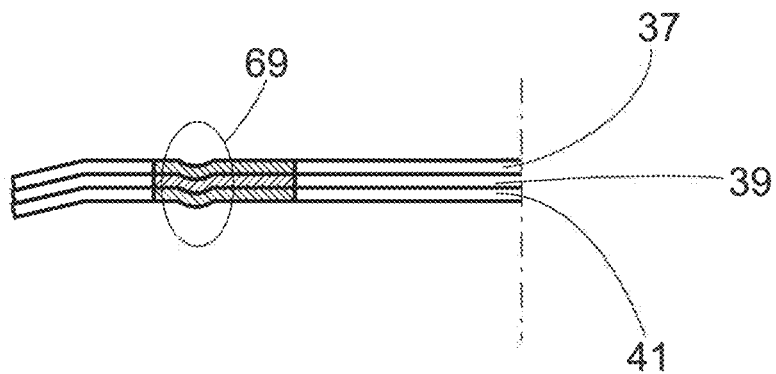
FIG. 8 is a cross-sectional view of a star spring package with clinched connections.

FIG. 8 shows a further variant in which the support rings are connected to one via anti-rotation elements in the form of clinched connections 69. The clinched connections need not be implemented to the extent that a complete closing head results. An interference fit between the areas of the support rings 37; 39; 41 which engage one inside the other is completely sufficient to realize the required holding forces.

Figure 9:
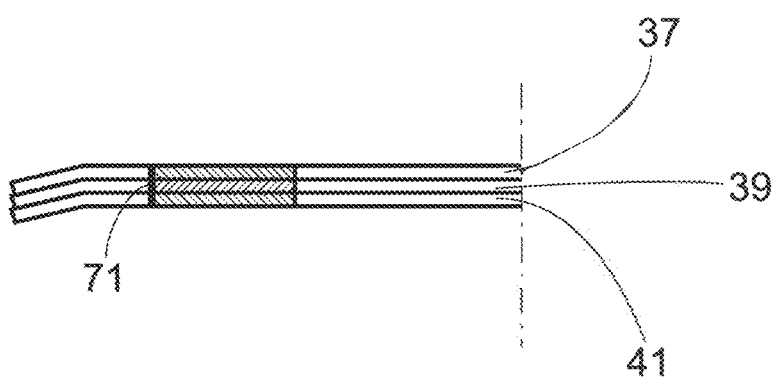
FIG. 9 is a partial cross-sectional view of a star spring package with laser weld.

In a further embodiment according to FIG. 9, the anti-rotation element is formed by a laser weld 71 which is preferably carried out at the outer edge area of the support rings 37; 39; 41 because access for a welding tool is particularly simple at that location. The laser weld 71 exerts particularly low heat stress and can therefore also be used favorably with star springs 31; 33; 35 with very thin walls.

Figure 10:
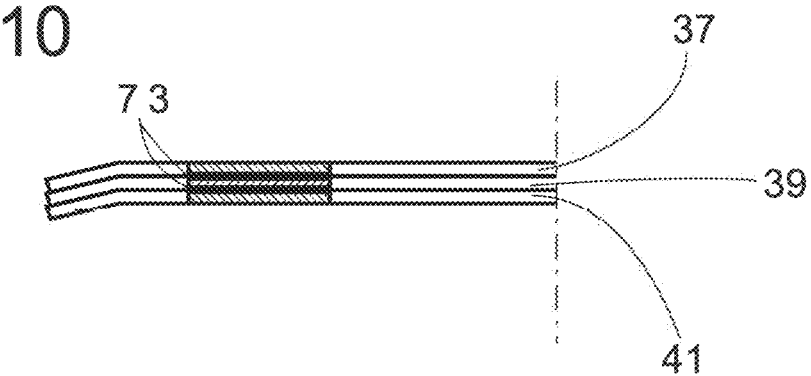
FIG. 10 is a partial cross-sectional view of a star spring package with glue joint.

In principle, it is also possible referring to FIG. 10 for the support rings 37; 39; 41 of the star springs 31; 33; 35 to be glued to one another via a glue layer 73 between the star springs 31; 33; 35 so that the glue layer forms the anti-rotation element. In view of the reduced requirements, a simple gluing technique can also be used because, as has already been mentioned more than once, the glue connection need not be durable.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A damping valve comprising:
a damping valve body comprising at least one through-channel having an outlet cross section;
at least one valve disk at least partially covering the outlet cross section;
at least two star springs constructed to preload the at least one valve disk, each of the at least two star springs comprising a support ring and a plurality of radial spring arms; the support rings disposed on top of each other in the installed positon;
the star springs being layered in the same orientation such that the spring arms of at least two adjacent star springs are facing in the same direction with respect to the at least one valve disk; and
an anti-rotation element preventing the adjacent star springs from rotating with respect to each other in an assembled position,
wherein the anti-rotation element is formed by at least one weld.

2. The damping valve according to claim 1, wherein the weld is a resistance weld.

3. The damping valve according to claim 1, wherein the star springs comprise at least one access opening which is at least partially covered with a support ring by an adjacent star spring.

4. The damping valve according to claim 3, wherein the support ring has at least one radial projection for the arrangement of the anti-rotation element.

5. The damping valve according to claim 1, wherein the weld is a laser weld.

6. The damping valve according to claim 1, wherein the anti-rotation element is connected with the support ring outside of the spring arms.

7. The damping valve according to claim 1, wherein the support rings are connected to one another by clinched connections.

8. The damping valve according to claim 1, wherein the support rings are glued together.

9. A damping valve comprising:
a damping valve body comprising at least one through-channel having an outlet cross section;
at least one valve disk at least partially covering the outlet cross section;
at least two star springs constructed to preload the at least one valve disk, each of the at least two star springs comprising a support ring and a plurality of radial spring arms; the support rings disposed on top of each other in the installed positon;
the star springs being layered in the same orientation such that the spring arms of at least two adjacent star springs are facing in the same direction with respect to the at least one valve disk; and
an anti-rotation element preventing the adjacent star springs from rotating with respect to each other in an assembled position,
wherein the anti-rotation element is formed by a fixing pin which passes through the support rings.

10. A damping valve comprising:
a damping valve body comprising at least one through-channel having an outlet cross section;
at least one valve disk at least partially covering the outlet cross section;
at least two star springs constructed to preload the at least one valve disk, each of the at least two star springs comprising a support ring and a plurality of radial spring arms; the support rings disposed on top of each other in the installed positon;
the star springs being layered in the same orientation such that the spring arms of at least two adjacent star springs are facing in the same direction with respect to the at least one value disk; and
an anti-rotation element preventing the adjacent star springs from rotating with respect to each other in an assembled position,
wherein the anti-rotation element is formed by a fixing sleeve.

11. The damping valve according to claim 10, wherein the fixing sleeve engages at the support rings at an inner side.

12. The damping valve according to claim 10, wherein the fixing sleeve engages at the support rings at an outer side and further comprising relief cuts for receiving the spring arms.

* * * * *